United States Patent
Yoda

(10) Patent No.: US 9,507,395 B2
(45) Date of Patent: Nov. 29, 2016

(54) ELECTRONIC APPARATUS INCLUDING DC-DC CONVERTERS

(71) Applicant: FUJITSU LIMITED, Kawasaki-shi, Kanagawa (JP)

(72) Inventor: Katsuhiro Yoda, Kodaira (JP)

(73) Assignee: FUJITSU LIMITED, Kawasaki (JP)

( * ) Notice: Subject to any disclaimer, the term of this patent is extended or adjusted under 35 U.S.C. 154(b) by 238 days.

(21) Appl. No.: 14/337,581

(22) Filed: Jul. 22, 2014

(65) Prior Publication Data
US 2015/0046725 A1    Feb. 12, 2015

(30) Foreign Application Priority Data
Aug. 12, 2013    (JP) .................. 2013-167853

(51) Int. Cl.
G06F 1/26    (2006.01)
G06F 1/32    (2006.01)

(52) U.S. Cl.
CPC ...................... *G06F 1/26* (2013.01)

(58) Field of Classification Search
CPC ........................................... G06F 1/26
USPC ................................. 713/300, 320
See application file for complete search history.

(56) References Cited

U.S. PATENT DOCUMENTS

| | | | | |
|---|---|---|---|---|
| 6,836,850 B2* | 12/2004 | Cheng | .................. | G06F 1/3203 713/320 |
| 7,480,812 B2* | 1/2009 | Kito | ...................... | G06F 1/3228 713/300 |
| 9,032,231 B1* | 5/2015 | Crisp | ................ | H04W 52/0293 713/323 |
| 2008/0126686 A1* | 5/2008 | Sokolov | ................ | G06F 1/3203 711/103 |

FOREIGN PATENT DOCUMENTS

JP    2010-213466    9/2010

* cited by examiner

*Primary Examiner* — Mark Connolly
(74) *Attorney, Agent, or Firm* — Fujitsu Patent Center

(57) ABSTRACT

An electronic apparatus includes a first DC-DC converter configured to generate a first direct-current power supply voltage based on an input direct-current voltage, a second DC-DC converter configured to generate a second direct-current power supply voltage based on the input direct-current voltage, a first circuit configured to operate with the first direct-current power supply voltage to perform a first process, a second circuit configured to operate with the second direct-current power supply voltage to perform a second process whose load is able to be reduced by the first process, and a control circuit configured to change, in response to the input direct-current voltage, a ratio between a volume of processing of the first process and a volume of processing of the second process.

8 Claims, 11 Drawing Sheets

ELECTRONIC APPARATUS INCLUDING DC-DC CONVERTERS

CROSS-REFERENCE TO RELATED APPLICATIONS

The present application is based upon and claims the benefit of priority from the prior Japanese Patent Application No. 2013-167853 filed on Aug. 12, 2013, with the Japanese Patent Office, the entire contents of which are incorporated herein by reference.

FIELD

The disclosures herein generally relate to an electronic apparatus.

BACKGROUND

A DC-DC converter generates an output direct-current voltage based on an input direct-current voltage. Such a DC-DC converter suffers increased power loss in the internal circuits thereof when a voltage difference between the input direct-current voltage and the output direct-current voltage increases.

FIG. 1 is a drawing illustrating an example of the loss characteristics of a DC-DC converter. Specifically, the example of loss characteristics illustrated in FIG. 1 is the characteristics of Texas Instruments TPS61200 converters. The horizontal axis represents input voltage, and the vertical axis represents efficiency. A 5-V-type DC-DC converter that generates an output direct-current voltage of 5 V exhibits an efficiency curve 10, and a 3.3-V-type DC-DC converter that generates an output direct-current voltage of 3.3 V exhibits an efficiency curve 11. In the case of the input direct-current voltage being 5 V, the 5-V-type DC-DC converter exhibits an efficiency of approximately 90% (i.e., 10% loss), and the 3.3-V-type DC-DC converter exhibits an efficiency of approximately 60% (i.e., 40% loss). In the case of the input direct-current voltage being 3.3 V, the 5-V-type DC-DC converter exhibits an efficiency of approximately 55% (i.e., 45% loss), and the 3.3-V-type DC-DC converter exhibits an efficiency of approximately 80% (i.e., 20% loss).

In an electronic apparatus that uses a rechargeable battery, a DC-DC converter inside the electronic apparatus converts the voltage of the rechargeable battery into a predetermined power supply voltage, which is then supplied to the circuits inside the electronic apparatus. In such a configuration, the output voltage of the rechargeable battery changes in response to the battery level of the rechargeable battery, which results in changes with time in the input direct-current voltage of the DC-DC converter.

Recently, a technology called "energy harvest" has been proposed that acquires electric power from environment and stores the acquired power in a capacitor for subsequent use. In this energy harvest, the charge level of the capacitor constantly changes due to the unstable nature of power supply extracted from environment. The use of energy harvest as the power supply source for an electronic apparatus thus gives rise to a problem of constant changes in the input direct-current voltage of the DC-DC converter.

A change in the input direct-current voltage of a DC-DC converter causes an actual input direct-current voltage to divert from the input direct-current voltage that ensures minimum power loss in the DC-DC converter, thereby resulting in a situation in which the electronic apparatus is operating in a condition that creates significant power loss.

[Patent Document 1] Japanese Patent Application Publication No. 2010-213466

SUMMARY

According to an aspect of the embodiment, an electronic apparatus includes a first DC-DC converter configured to generate a first direct-current power supply voltage based on an input direct-current voltage, a second DC-DC converter configured to generate a second direct-current power supply voltage based on the input direct-current voltage, a first circuit configured to operate with the first direct-current power supply voltage to perform a first process, a second circuit configured to operate with the second direct-current power supply voltage to perform a second process whose load is able to be reduced by the first process, and a control circuit configured to change, in response to the input direct-current voltage, a ratio between a volume of processing of the first process and a volume of processing of the second process.

According to an aspect of the embodiment, an electronic apparatus includes a first DC-DC converter configured to generate a first direct-current power supply voltage based on an input direct-current voltage, a second DC-DC converter configured to generate a second direct-current power supply voltage based on the input direct-current voltage, a sensor, a processing circuit configured to operate with the first direct-current power supply voltage to perform a computation process on data collected by the sensor, a transmission unit configured to operate with the second direct-current power supply voltage to transmit either the data collected by the sensor or the data that has gone through the computation process, and a control circuit configured to select a first operation mode or a second operation mode in response to the input direct-current voltage, wherein in the first operation mode the data collected by the sensor is transmitted from the transmission unit, and in the second operation mode the data collected by the sensor is subjected to the computation process by the processing circuit, and the data having gone through the computation process is transmitted from the transmission unit.

According to an aspect of the embodiment, an electronic apparatus includes a first DC-DC converter configured to generate a first direct-current power supply voltage based on an input direct-current voltage, a second DC-DC converter configured to generate a second direct-current power supply voltage based on the input direct-current voltage, an acceleration sensor configured to measure acceleration, a location measuring circuit configured to operate with the first direct-current power supply voltage to perform a location measuring process that measures a location, a processing circuit configured to operate with the second direct-current power supply voltage to perform a computation process that modifies the measured location in response to the measured acceleration, and a control circuit configured to select a first operation mode or a second operation mode in response to the input direct-current voltage, wherein in the first operation mode the location measuring process is performed at first frequency, and in the second operation mode the location measuring process is performed at second frequency lower than the first frequency, and the acceleration sensor measures acceleration, with the measured location being modified based on the measured acceleration.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings.

Figure 2:
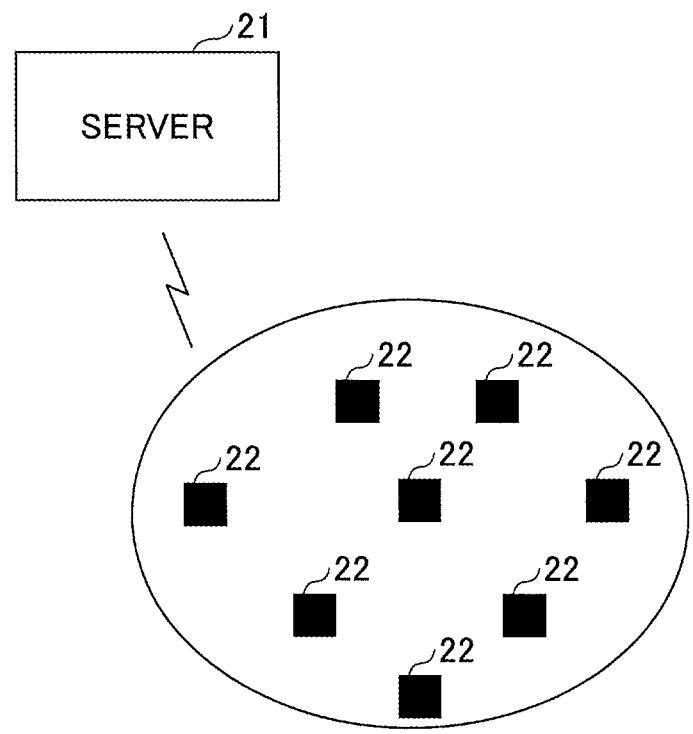
FIG. 2 is a drawing illustrating an example of the configuration of a data collecting system.

FIG. 2 is a drawing illustrating an example of the configuration of a data collecting system. The data collecting system illustrated in FIG. 2 includes a server 21 and a plurality of sensor nodes 22. The sensor nodes 22 are situated in an area subjected to monitoring. Each of the sensor nodes 22 uses radio transmission to send captured image data to the server 21. The server 21 applies image processing on the image data received from each of the sensor nodes to acquire information about the surroundings of the position where each of the sensor nodes 22 is situated.

Figure 3:
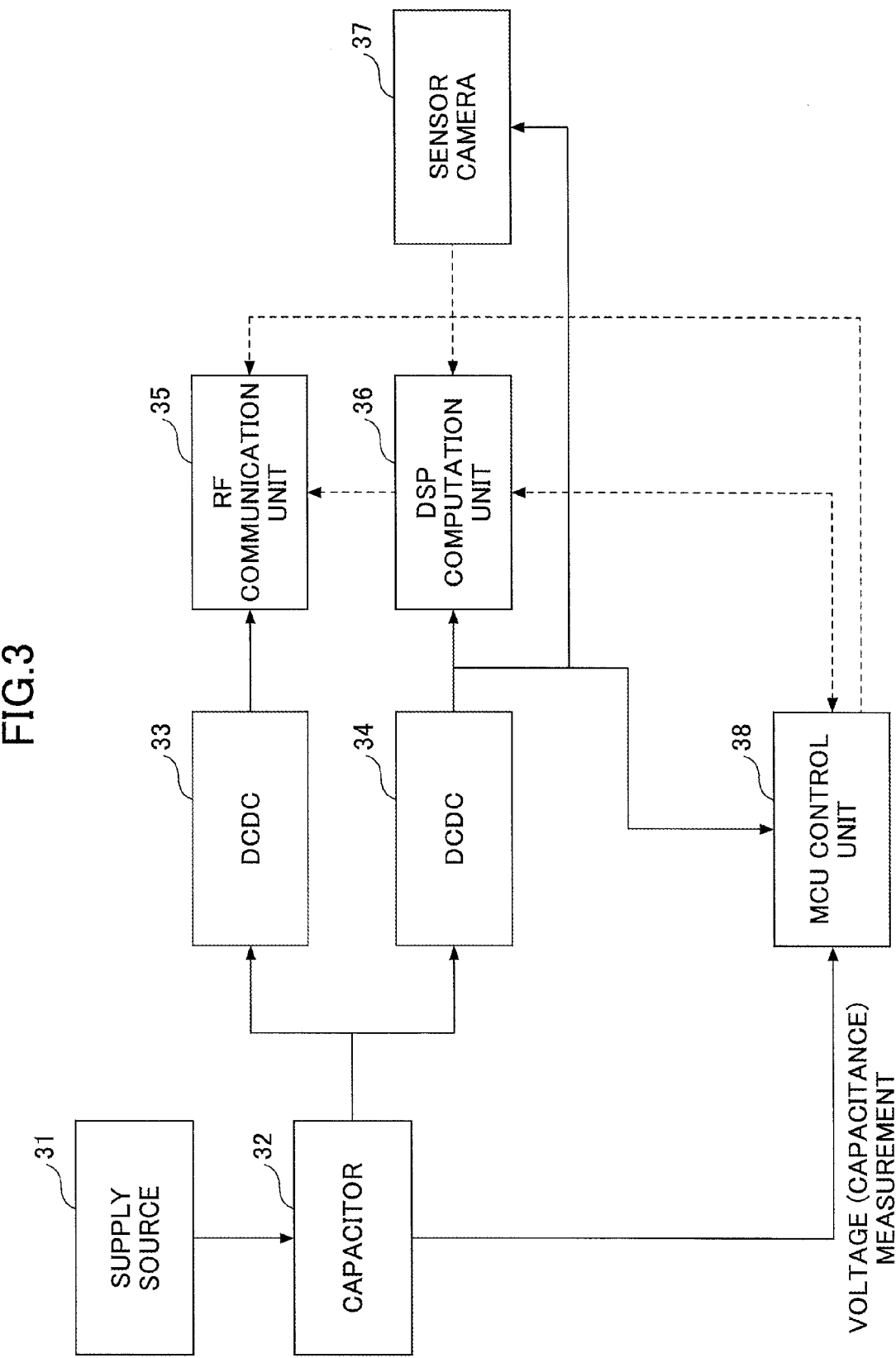
FIG. 3 is a drawing illustrating an example of the configuration of a sensor node.

FIG. 3 is a drawing illustrating an example of the configuration of a sensor node 22. The sensor node 22 illustrated in FIG. 3 includes a supply source 31, a capacitor 32, a DC-DC converter 33, a DC-DC converter 34, an RF communication unit 35, a DSP computation unit 36, a sensor camera 37, and an MCU control unit 38. Boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together. It may be noted, however, that different functional or circuit blocks (e.g., the RF communication unit 35 and the DSP computation unit 36) that operate with different power supply voltages in FIG. 3 are of course coupled to separate power supply systems.

The supply source 31 converts energy supplied from environment (i.e., energy harvest) into electric power, which is then supplied to the capacitor 32. The charge level of the capacitor 32 varies depending on the amount of electric power supplied from the supply source 31 and the amount of electric power consumed by the sensor node 22. Although the example of the configuration illustrated in FIG. 3 assumes the use of energy harvest, a rechargeable battery may be provided in place of the supply source 31 and the capacitor 32. The configuration in which the supply source 31 and the capacitor 32 are provided and the configuration in which a rechargeable battery is provided are basically the same in the sense that the voltage supplied therefrom varies with time. In the configuration in which a rechargeable battery is provided, however, the voltage supplied from the rechargeable battery monotonously decreases with time unless the battery is charged.

Figure 1:
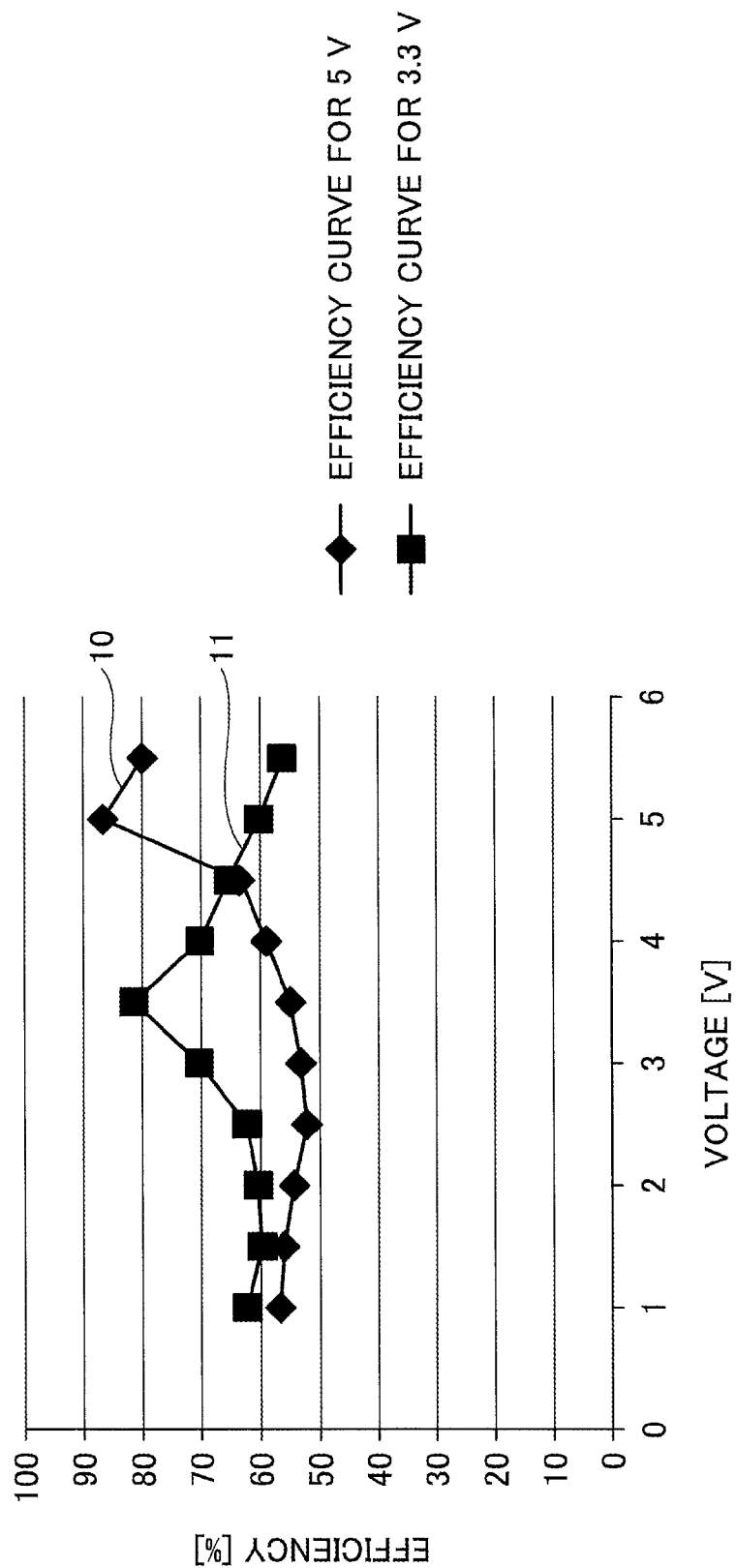
FIG. 1 is a drawing illustrating an example of the loss characteristics of a DC-DC converter.

The power supply voltage with which the RF communication unit 35 operates is typically higher than the power supply voltage with which the sensor camera 37 and the MCU control unit 38 operate. Namely, the DSP computation unit 36, the sensor camera 37, and the MCU control unit 38 operate with a first direct-current power supply voltage, and the RF communication unit 35 operates with a second direct-current power supply voltage higher than the first direct-current power supply voltage. As examples, the first direct-current power supply voltage is 3.3 V, and the second direct-current power supply voltage is 5.0 V. The DC-DC converter 34 generates the first direct-current power supply voltage based on the input direct-current voltage from the capacitor 32. The DC-DC converter 33 generates the second direct-current power supply voltage based on the input direct-current voltage from the capacitor 32. The DC-DC converter 34 may have the characteristics as specified by the efficiency curve 11 illustrated in FIG. 1 with respect to the input direct-current voltage. The DC-DC converter 33 may have the characteristics as specified by the efficiency curve illustrated in FIG. 1 with respect to the input direct-current voltage.

The sensor camera 37 generates image data with respect to a captured image, and supplies the image data to the DSP computation unit 36. The DSP computation unit 36 either supplies the image data without any change to the RF communication unit 35 or applies processing on the image data for data size reduction to supply the size-reduced data to the RF communication unit 35. The RF communication unit 35 transmits to the server 21 illustrated in FIG. 2 either the pre-processing image data (i.e., original image data) or the size-reduced data supplied from the DSP computation unit 36. The process for reducing data size may be an image compression process. The size-reduced data in this case may be compressed image data. Alternatively, the process for reducing data size may be a process that extracts certain image features from the image data. The sized-reduced data in this case may be image feature data.

The DSP computation unit 36 operates with the first direct-current power supply voltage to perform a first process. The RF communication unit 35 operates with the second direct-current power supply voltage to perform a second process whose load can be reduced by the first process. Specifically, the first process is a computation process that reduces the size of data (i.e., image data) supplied from the sensor camera 37, and the second process is a transmission process that transmits the data before data size reduction or the data after the data size reduction. The data-size-reduction process that is the first process reduces the size of data to be transmitted, thereby reducing the load on the transmission process that is the second process.

The MCU control unit 38 monitors the voltage of the capacitor 32 (i.e., the input direct-current voltage supplied to the DC-DC converters 33 and 34), and changes a ratio between the volume of processing of the first process (i.e., computation process) and the volume of processing of the second process (i.e., transmission process) in response to the monitored voltage. When increasing the volume of processing of the first process (i.e., computation process) in response to the input direct-current voltage, the MCU control unit 38 may decrease the volume of processing of the second process (i.e., transmission process). Specifically, the MCU control unit 38 may shorten the time length it takes for the second process (i.e., transmission process) to be performed, thereby decreasing the volume of processing of the second process. Namely, the first process (i.e., computation process) reduces the data size of image data supplied from the sensor camera 37, and the second process (i.e., transmission process) transmits the size-reduced data, so that the time length it takes for the second process (i.e., transmission process) to be performed can be shortened.

More specifically, there may be two operation modes for the RF communication unit 35 and the DSP computation unit 36. In the first operation mode, the RF communication unit 35 transmits data collected by the sensor camera 37. In the second operation mode, the DSP computation unit 36 performs a computation process on the data collected by the sensor camera 37, and, then, the RF communication unit 35 transmits the data (e.g., compressed image, feature data, etc.) to which the computation process has been applied.

Figure 4A:
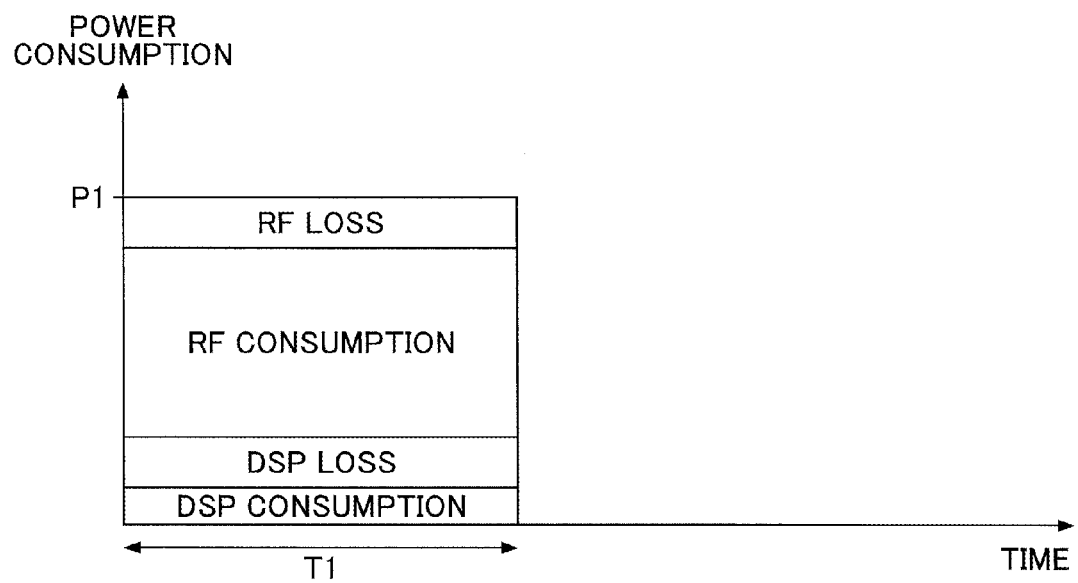
FIGS. 4A and 4B are drawings illustrating the amount of power consumption in a first operation mode and the amount of power consumption in a second operation mode.
Figure 4B:
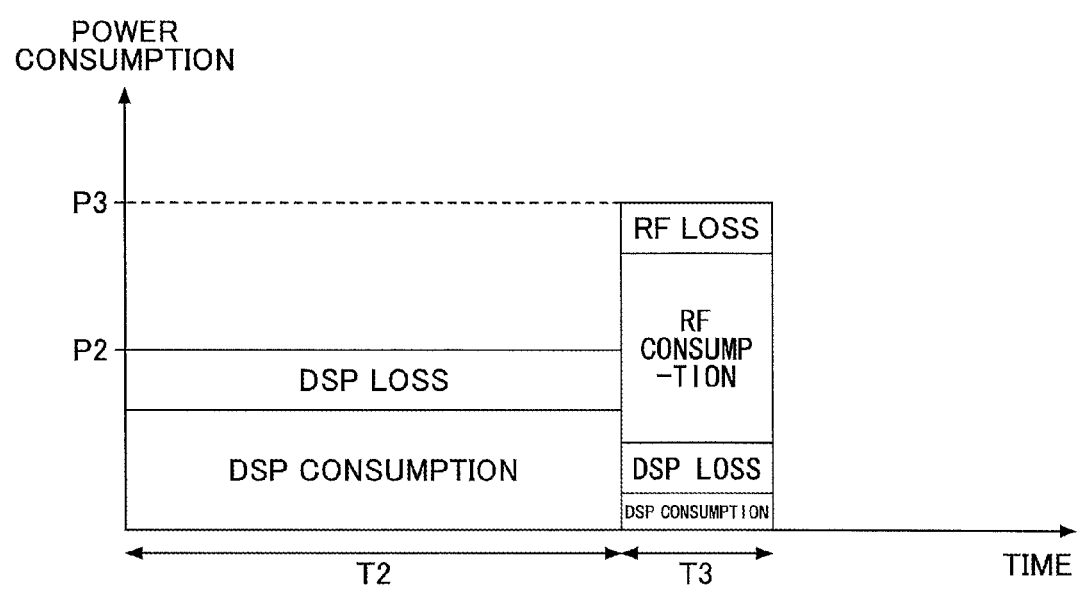

FIGS. 4A and 4B are drawings illustrating the amount of power consumption in the first operation mode and the amount of power consumption in the second operation mode. FIG. 4A illustrates the amount of power consumption in the first operation mode (i.e., mode 1), and FIG. 4B illustrates the amount of power consumption in the second operation mode (i.e., mode 2). In FIGS. 4A and 4B, the horizontal axis represents time, and the vertical axis represents power consumption.

In the first operation mode illustrated in FIG. 4A, as was previously described, the RF communication unit 35 transmits the image data, as it is, collected by the sensor camera 37. At this time, the amount of transmitted data is relatively large. It takes a time length T1, for example, for the transmission process of the RF communication unit 35 to transmit a single image. During the duration of the time length T1, the DSP computation unit 36 keeps its operation to a minimum. Through such a minimum operation, the DSP computation unit 36 transfers the image data supplied from the sensor camera 37 to the RF communication unit 35, and performs other control-related processes. In FIG. 4A, the amount of power consumption by the DSP computation unit 36 is illustrated as "DSP CONSUMPTION". The amount of power loss in the DC-DC converter 34 that supplies the first direct-current power supply voltage to the DSP computation unit 36 is illustrated as "DSP LOSS". Further, in FIG. 4A, the amount of power consumption by the RF communication unit 35 is illustrated as "RF CONSUMPTION". The amount of power loss in the DC-DC converter 33 that supplies the second direct-current power supply voltage to the RF communication unit 35 is illustrated as "RF LOSS".

In FIG. 4A, the amount of power consumption during the time length T1 is P1. In this case, T1×P1 represents the total amount of power consumption that is used to transmit a single image in the first operation mode.

In the second operation mode illustrated in FIG. 4B, as was previously described, the DSP computation unit 36 performs a computation process on the data collected by the sensor camera 37, and, then, the RF communication unit 35 transmits the data (e.g., compressed image, feature data, etc.) to which the computation process has been applied. At this time, the amount of transmitted data is relatively small. It takes a time length T3 for the transmission process of the RF communication unit 35 to transmit a single data item that is obtained by the computation process and that corresponds to a single image. During the time length T3, the DSP computation unit performs only a minimum operation to attend to control-related processes. The time length T3 is shorter than the time length T1 illustrated in FIG. 4A. The computation process performed by the DSP computation unit 36 with respect to the image data collected by the sensor camera 37 is performed by taking the time length T2 prior to the transmission process. During the time length T2, the DSP computation unit 36 performs the computation process that reduces the data size of image data. In FIG. 4B, the amount of power consumption by the DSP computation unit 36 is illustrated as "DSP CONSUMPTION". The amount of power loss in the DC-DC converter 34 that supplies the first direct-current power supply voltage to the DSP computation unit 36 is illustrated as "DSP LOSS". Further, in FIG. 4B, the amount of power consumption by the RF communication unit 35 is illustrated as "RF CONSUMPTION". The amount of power loss in the DC-DC converter 33 that supplies the second direct-current power supply voltage to the RF communication unit 35 is illustrated as "RF LOSS".

In FIG. 4B, the amount of power consumption during the time length T2 is P2. The amount of power consumption during the time length T3 is P3. In this case, the total amount of power that is consumed to generate and transmit the size-reduced data corresponding to a single image in the second mode is represented as T2×P2+T3×P3.

As can be seen from FIG. 4A, the ratio of contribution of "RF LOSS" is relatively large in the first operation mode. "RF LOSS" refers to the loss of the DC-DC converter 33 that generates a direct-current voltage of 5 V. "RF LOSS" becomes the smallest when the input direct-current voltage is around 5 V. Namely, in the first operation mode, the loss of the DC-DC converters becomes relatively small when the input direct-current voltage is set to a relatively high voltage (e.g., around 5 V), rather than when the input direct-current voltage is set to a relatively low voltage (e.g., around 3.3 V).

As can be seen from FIG. 4B, the ratio of contribution of "DSP LOSS" is relatively large in the second operation mode. "DSP LOSS" refers to the loss of the DC-DC converter 34 that generates a direct-current voltage of 3.3 V. "DSP LOSS" becomes the smallest when the input direct-current voltage is around 3.3 V. Namely, in the second operation mode, the loss of the DC-DC converters becomes relatively small when the input direct-current voltage is set to a relatively low voltage (e.g., around 3.3 V), rather than when the input direct-current voltage is set to a relatively high voltage (e.g., around 5 V).

In consideration of the above, it is preferable for the purpose of reducing the amount of power consumption to use the first operation mode in the case of the input direct-current voltage being relatively high and to use the second operation mode in the case of the input direct-current voltage being relatively low.

Figure 5:
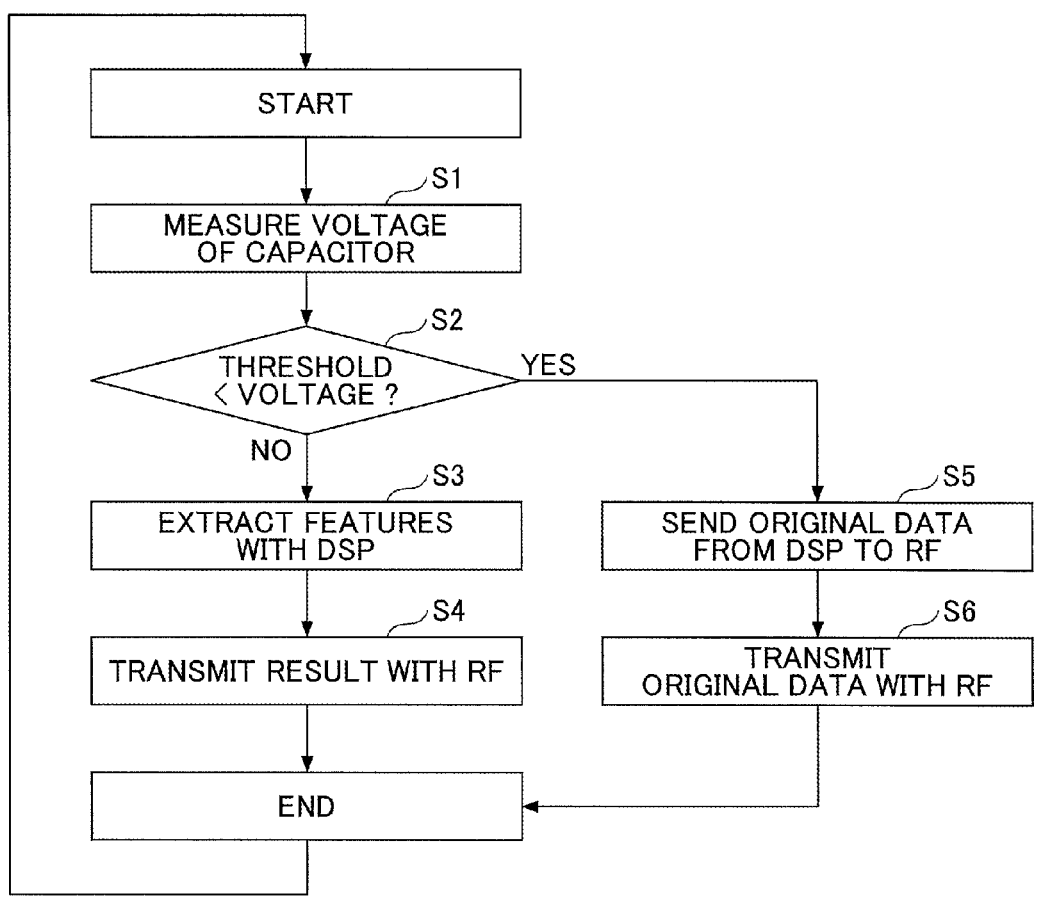
FIG. 5 is a drawing illustrating an example of a control operation performed by an MCU control unit.

FIG. 5 is a drawing illustrating an example of a control operation performed by the MCU control unit 38. In FIG. 5, in step S1, the MCU control unit 38 measures the voltage of the capacitor 32. In step S2, the MCU control unit 38 checks whether the measured voltage is higher than a predetermined threshold. In the case of the measured voltage being higher than the predetermined threshold, in step S5, the MCU control unit 38 controls and causes the DSP computation unit 36 to supply the image data (i.e., original data) from the sensor camera 37, as it is, to the RF communication unit 35. In step S6, the RF communication unit 35 under the control of the MCU control unit 38 transmits the image data (i.e., original data) as it is.

In the case of the check in step S2 indicating that the measured voltage is not higher than the predetermined threshold, in step S3, the MCU control unit 38 controls and causes the DSP computation unit 36 to applies a computation process on the image data from the sensor camera 37, thereby reducing the data size. Namely, the computation process extracts feature quantities from the image, for example. In step S4, the RF communication unit 35 under the control of the MCU control unit 38 transmits the size-reduced data (e.g., feature quantity data).

Figure 6:
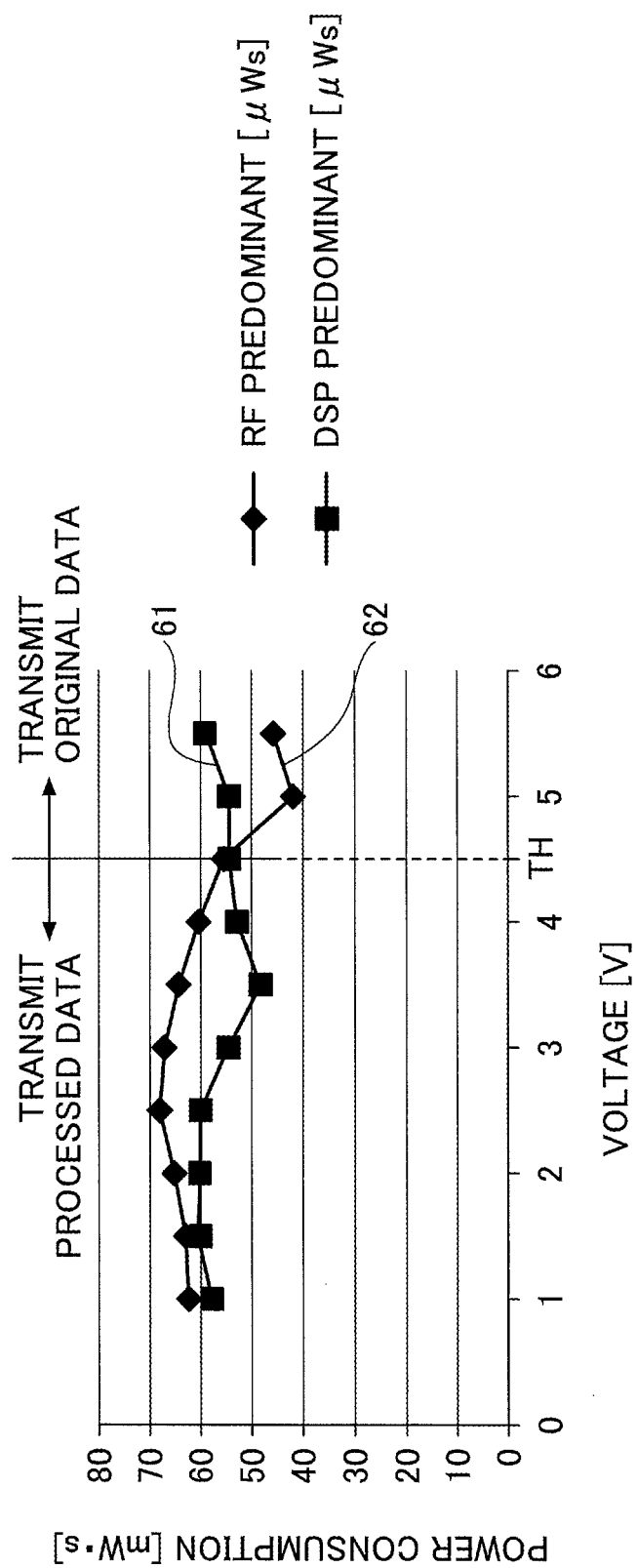
FIG. 6 is a drawing illustrating the effect of switching of operation modes in response to an input direct-current voltage.

FIG. 6 is a drawing illustrating the effect of switching of operation modes in response to the input direct-current voltage. It is assumed that the DC-DC converters 33 and 34 have the efficiency curve illustrated in FIG. 1, and that T1, T2 an T3 in FIG. 4 are 0.67 seconds, 0.8 seconds and 0.17 seconds, respectively. Further, the amount of power consumption by the RF communication unit 35 at the time of communication is 10 mA. The amount of power consumption by the DSP computation unit 36 is 10 mA at the time of computation (i.e., during T2) and 1 mA at the time of communication (i.e., during T3). Specifically, single image data is a size of 160×120×2 bytes. Computation is then performed to extract 300 feature points to reduce the data size.

In FIG. 6, the horizontal axis represents input direct-current voltage (i.e., the voltage of the capacitor 32), and the vertical axis represents the total amount of power consumption (i.e., the total area size illustrated in FIG. 4A or the total area size illustrated in FIG. 4B). In FIG. 6, a curve 62 represents the total amount of power consumption with respect to each input direct-current voltage in the first operation mode, and a curve 61 represents the total amount of power consumption with respect to each input direct-current voltage in the second operation mode. In the case of the input direct-current voltage being relatively high, the total amount of power consumption is smaller in the first operation mode. In the case of the input direct-current voltage being relatively low, the total amount of power consumption is smaller in the second operation mode. In this example, a threshold voltage TH is about 4.5 V. Which one of the curve 61 and the curve 62 is higher than the other differs between the left-hand side and the right-hand side of the threshold voltage TH. Namely, it is preferable for the purpose of reducing power consumption to use the first operation mode when the input direct-current voltage is higher than the threshold voltage TH and to use the second operation mode when the input direct-current voltage is lower than the threshold voltage TH.

Figure 7:
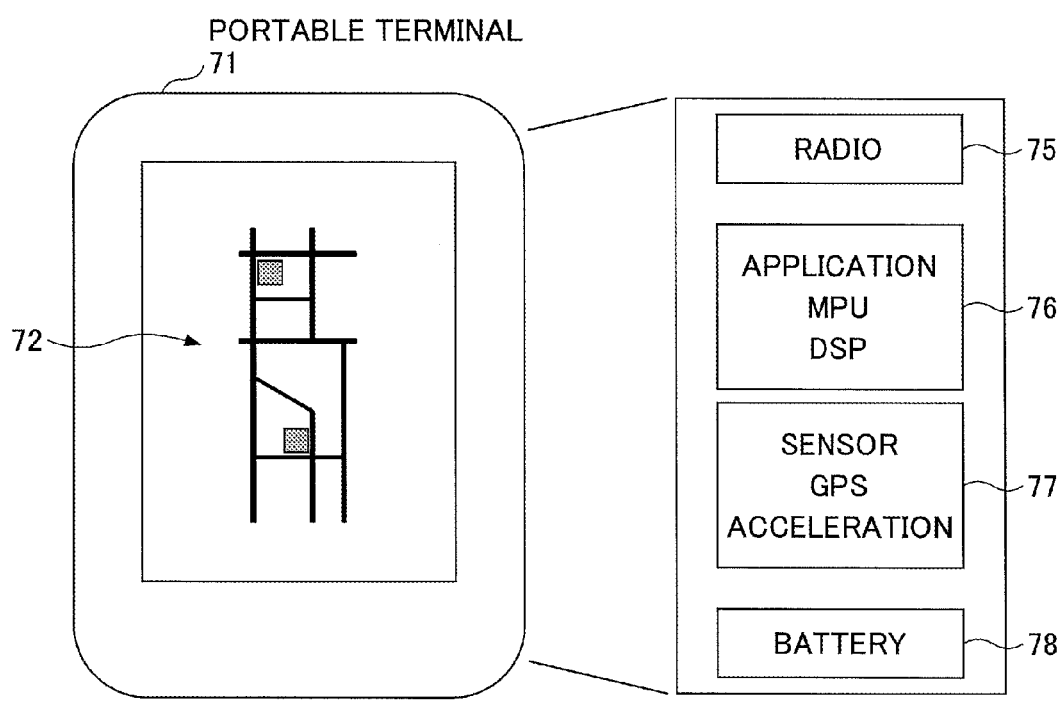
FIG. 7 is a drawing illustrating an example of a portable terminal that acquires location information.

FIG. 7 is a drawing illustrating an example of a portable terminal that acquires location information. A portable terminal 71 illustrated in FIG. 7 acquires information about the current location of the portable terminal 71 by use of a GPS (i.e., global positioning system) or the like to display a map 72 around the current location on the display screen. The portable terminal 71 may indicate its current position on the map 72. The portable terminal 71 includes a wireless unit 75, a unit 76, a unit 77, and a battery 78. The unit 77 includes an application, an MPS (i.e., micro-processing unit), a DSP (i.e., digital signal processing), and so on. The unit 77 includes a camera sensor, a GPS, an acceleration sensor, and so on.

Figure 8:
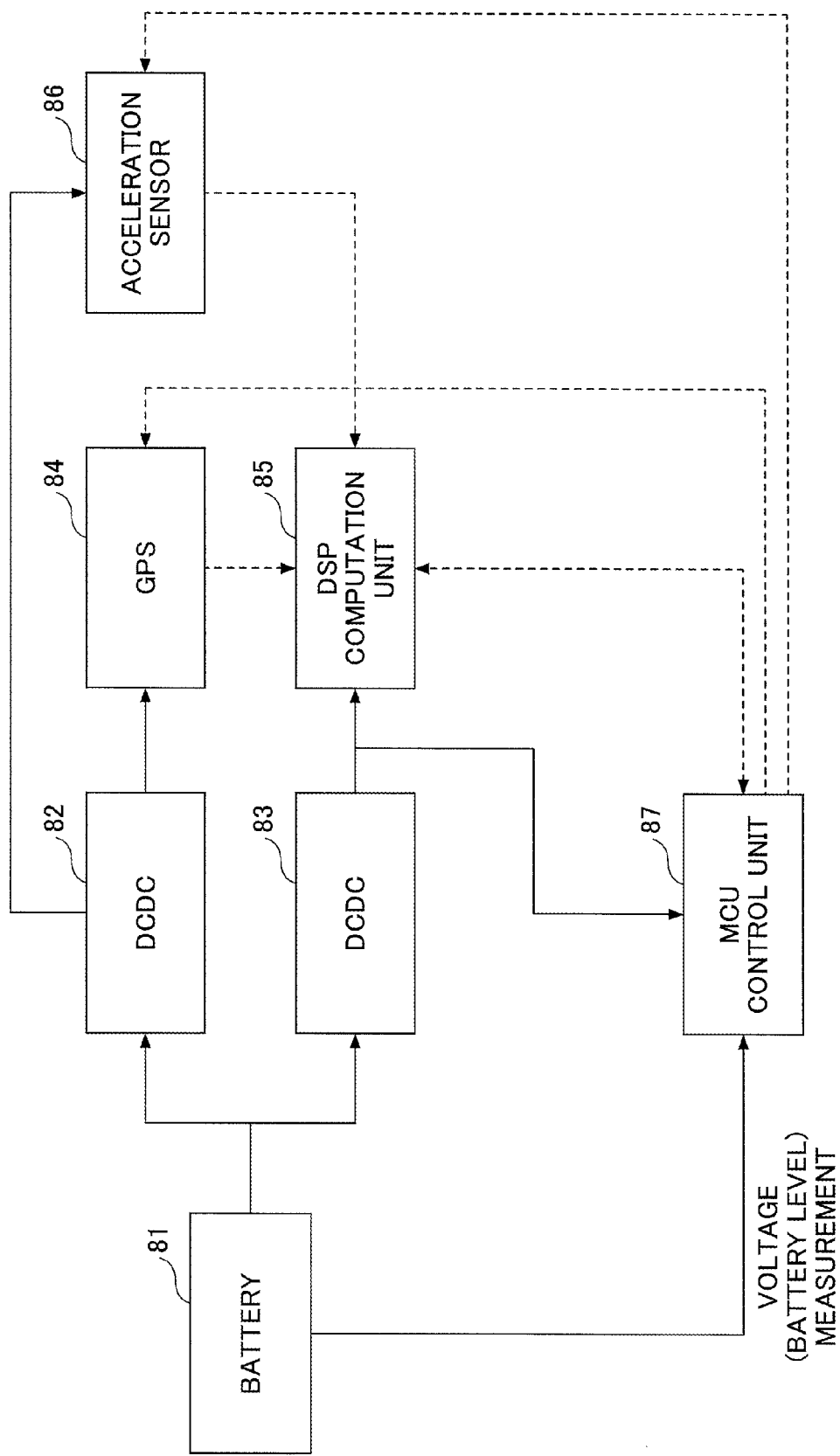
FIG. 8 is a drawing illustrating an example of the configuration of the portion of the portable terminal that relates to the processing of location information.

FIG. 8 is a drawing illustrating an example of the configuration of the portion of the portable terminal 71 that relates to the processing of location information. The portable terminal 71 illustrated in FIG. 8 includes a battery 81, a DC-DC converter 82, a DC-DC converter 83, a GPS 84, a DSP computation unit 85, an acceleration sensor 86, and an MCU control unit 87. Boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together. It may be noted, however, that different functional or circuit blocks (e.g., the GPS 84 and the DSP computation unit 85) that operate with different power supply voltages in FIG. 8 are of course coupled to separate power supply systems.

The battery 81 accumulates charged electric power that is supplied from an external source, and discharges the accumulated electric power to supply a direct-current voltage to the DC-DC converter 82 and the DC-DC converter 83. Unless the battery 81 is charged from an external source, the voltage that the battery 81 supplies monotonously decreases with the passage of time.

The power supply voltage with which sensor devices operate is typically higher than the power supply voltage with which the DSP computation unit 85 and the MCU control unit 87 operate. Namely, the DSP computation unit 85 and the MCU control unit 87 operate with a first direct-current power supply voltage, and the GPS 84 and the acceleration sensor 86 operate with a second direct-current power supply voltage higher than the first direct-current power supply voltage. As examples, the first direct-current power supply voltage is 3.3 V, and the second direct-current power supply voltage is 5.0 V. The DC-DC converter 83 generates the first direct-current power supply voltage based on the input direct-current voltage from the battery 81. The DC-DC converter 82 generates the second direct-current power supply voltage based on the input direct-current voltage from the battery 81. The DC-DC converter 83 may have the characteristics as specified by the efficiency curve 11 illustrated in FIG. 1 with respect to the input direct-current voltage. The DC-DC converter 82 may have the characteristics as specified by the efficiency curve 10 illustrated in FIG. 1 with respect to the input direct-current voltage.

The GPS 84 measures the current location of the portable terminal 71, and supplies location data indicative of the measured location to the DSP computation unit 85. The acceleration sensor 86 measures the acceleration applied to the acceleration sensor 86 as the portable terminal 71 changes its location. The acceleration sensor 86 supplies acceleration data indicative of the measured acceleration to the DSP computation unit 85. The DSP computation unit 85 modifies the location data from the GPS 84 based on the acceleration data from the acceleration sensor 86, thereby calculating the current location of the portable terminal 71 that has moved from the original location that was measured by the GPS 84.

The DSP computation unit 85 operates with the first direct-current power supply voltage to perform a first process. The GPS 84 operates with the second direct-current power supply voltage to perform a second process whose load can be reduced by the first process. Specifically, the first process is a computation process that modifies the measured location based on the acceleration of the portable terminal 71, and the second process is a location measuring process that measures the location of the portable terminal 71. The use of the first process that is the location modifying process can reduce the frequency at which the second process that is the location measuring process is performed, thereby reducing the load of the second process. It may be noted that the acceleration data used in the location modifying process is supplied from the acceleration sensor 86.

The MCU control unit 87 monitors the voltage of the battery 81 (i.e., the input direct-current voltage supplied to the DC-DC converters 82 and 83), and changes a ratio between the volume of processing of the first process (i.e., computation process) and the volume of processing of the second process (i.e., location measuring process) in response to the monitored voltage. When increasing the volume of processing of the first process (i.e., computation process) in response to the input direct-current voltage, the MCU control unit 87 may decrease the volume of processing of the second process (i.e., location measuring process). Specifically, the MCU control unit 87 may shorten the time length it takes for the second process (i.e., location measuring process) to be performed, thereby decreasing the volume of processing of the second process (i.e., location measuring process). Specifically, the MCU control unit 87 may shorten the total time length it takes for the second process (i.e., one or more location measuring processes) to be performed during a predetermined time period, thereby decreasing the volume of processing of the second process. Namely, the first process (i.e., computation process) compensates for a positional displacement from the location measured by GPS, thereby reducing the frequency at which the location measuring process is performed during a predetermined time period. With this arrangement, the total time length it takes for the second process, i.e., one or more location measuring processes, to be performed during the predetermined time period can be shortened.

More specifically, there may be two operation modes for the GPS 84 and the DSP computation unit 85. In the first operation mode, the process of measuring location by use of the GPS is performed at first frequency. In the second mode, the location measuring process is performed at second frequency lower than the first frequency, and, also, the acceleration sensor 86 measures acceleration so that the measured location is modified by use of the measured acceleration.

Figure 9A:
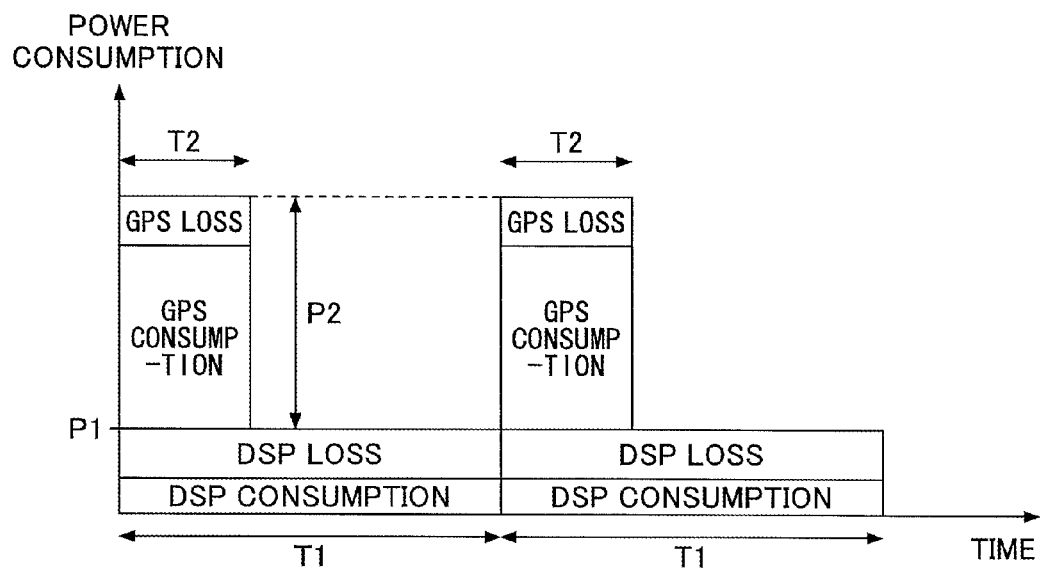
FIGS. 9A and 9B are drawings illustrating the amount of power consumption in a first operation mode and the amount of power consumption in a second operation mode.
Figure 9B:
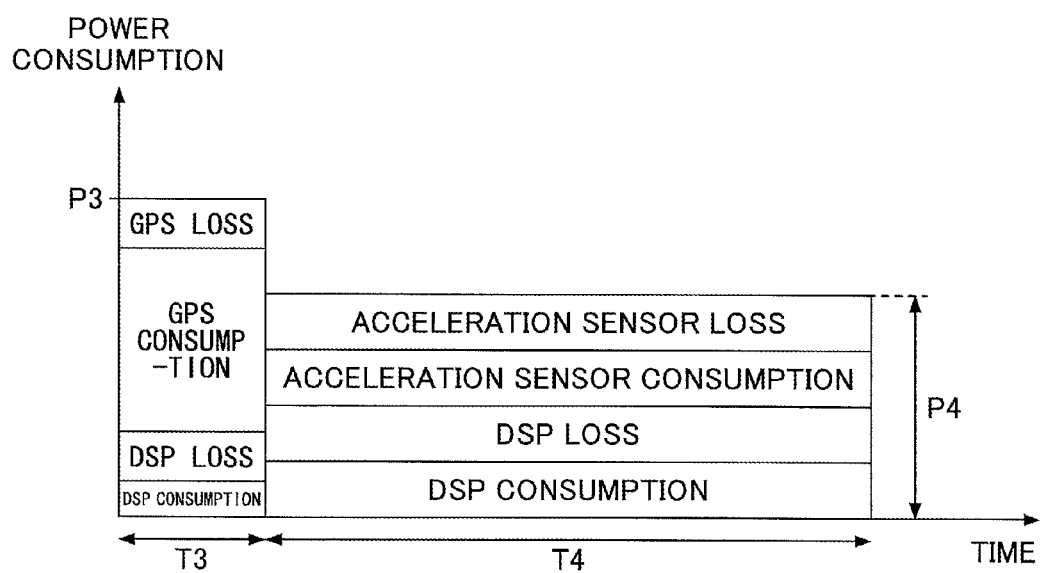

FIGS. 9A and 9B are drawings illustrating the amount of power consumption in the first operation mode and the amount of power consumption in the second operation mode. FIG. 9A illustrates the amount of power consumption in the first operation mode (i.e., mode 1), and FIG. 9B illustrates the amount of power consumption in the second operation mode (i.e., mode 2). In FIGS. 9A and 9B, the horizontal axis represents time, and the vertical axis represents power consumption.

In the first operation mode illustrated in FIG. 9A, as was previously described, the process of measuring location by use of the GPS is performed at first frequency. Namely, the location measuring process by use of the GPS 84 is performed once in a period T1. The time it takes for the GPS 84 to perform a single measurement process is T2. During T1, the DSP computation unit 85 performs only a minimum operation. That is, the DSP computation unit 85 performs a minimum operation with respect to location data supplied from the GPS 84 and with respect to other control-related processes. In FIG. 9A, the amount of power consumption by the DSP computation unit 85 is illustrated as "DSP CONSUMPTION". The amount of power loss in the DC-DC converter 83 that supplies the first direct-current power supply voltage to the DSP computation unit 85 is illustrated as "DSP LOSS". Further, in FIG. 9A, the amount of power consumption by the GPS 84 is illustrated as "GPS CONSUMPTION". The amount of power loss in the DC-DC converter 82 that supplies the second direct-current power supply voltage to the GPS 84 is illustrated as "GPS LOSS".

In FIG. 9A, the amount of DSP-related power consumption (i.e., consumption and loss) during the time length T1 is P1. The amount of GPS-related power consumption (i.e., consumption and loss) during the time length T2 is P2. In this case, the total amount of power consumed during the time period equal to the interval of the GPS location measuring process (i.e., the predetermined period T1) in the first operation mode is represented as T1×P1+T2×P2.

In the second mode illustrated in FIG. 9B, as was previously described, the location measuring process is performed at second frequency lower than the first frequency, and, also, the acceleration sensor 86 measures acceleration so that the measured location is modified by use of the measured acceleration. Specifically, the location measuring process by the GPS 84 is performed once in a period T3+T4. The time it takes for the GPS 84 to perform a single measurement process is T3. Here, T3 is equal to T2, and T3+T4 is longer than T1. During T3, the DSP computation unit 85 performs only a minimum operation. That is, the DSP computation unit 85 performs a minimum operation with respect to location data supplied from the GPS 84 and with respect to other control-related processes. Further, it takes the time length T4 for the acceleration sensor 86 and the DSP computation unit 85 to perform the acceleration measuring process and the modification process (correction process), respectively, following the location measuring process. During the time length T4, the acceleration sensor 86 measures acceleration, and the DSP computation unit 85 modifies the location measured by the GPS 84 based on the measured acceleration. In FIG. 9B, the amount of power consumption by the DSP computation unit 85 is illustrated as "DSP CONSUMPTION". The amount of power loss in the DC-DC converter 83 that supplies the first direct-current power supply voltage to the DSP computation unit 85 is illustrated as "DSP LOSS". Further, in FIG. 9B, the amount of power consumption by the GPS 84 is illustrated as "GPS CONSUMPTION". The amount of GPS-related power loss in the DC-DC converter 82 that supplies the second direct-current power supply voltage to the GPS 84 is illustrated as "GPS LOSS". Further, in FIG. 9B, the amount of power consumption by the acceleration sensor 86 is illustrated as "ACCELERATION SENSOR CONSUMPTION". The amount of acceleration-sensor-related power loss in the DC-DC converter 82 that supplies the second direct-current power supply voltage to the acceleration sensor 86 is illustrated as "ACCELERATION SENSOR LOSS".

In FIG. 9B, the amount of power consumption during the time length T3 is P3. The amount of power consumption during the time length T4 is P4. In this case, the total amount of power consumed during the time period equal to the interval of the GPS location measuring process (i.e., the predetermined period T3+T4) in the second operation mode is represented as T3×P3+T4×P4.

As can be seen from FIG. 9A, the ratio of contribution of "GPS LOSS" is relatively large in the first operation mode. "GPS LOSS" refers to the loss of the DC-DC converter 82 that generates a direct-current voltage of 5 V. "GPS LOSS" becomes the smallest when the input direct-current voltage is around 5 V. Namely, in the first operation mode, the loss of the DC-DC converters becomes relatively small when the input direct-current voltage is set to a relatively high voltage (e.g., around 5 V), rather than when the input direct-current voltage is set to a relatively low voltage (e.g., around 3.3 V).

As can be seen from FIG. 9B, the ratio of contribution of "DSP LOSS" is relatively large in the second operation mode. "DSP LOSS" refers to the loss of the DC-DC converter 83 that generates a direct-current voltage of 3.3 V. "DSP LOSS" becomes the smallest when the input direct-current voltage is around 3.3 V. Namely, in the second operation mode, the loss of the DC-DC converters becomes relatively small when the input direct-current voltage is set to a relatively low voltage (e.g., around 3.3 V), rather than when the input direct-current voltage is set to a relatively high voltage (e.g., around 5 V).

In consideration of the above, it is preferable for the purpose of reducing the amount of power consumption to use the first operation mode in the case of the input direct-current voltage being relatively high and to use the second operation mode in the case of the input direct-current voltage being relatively low.

Figure 10:
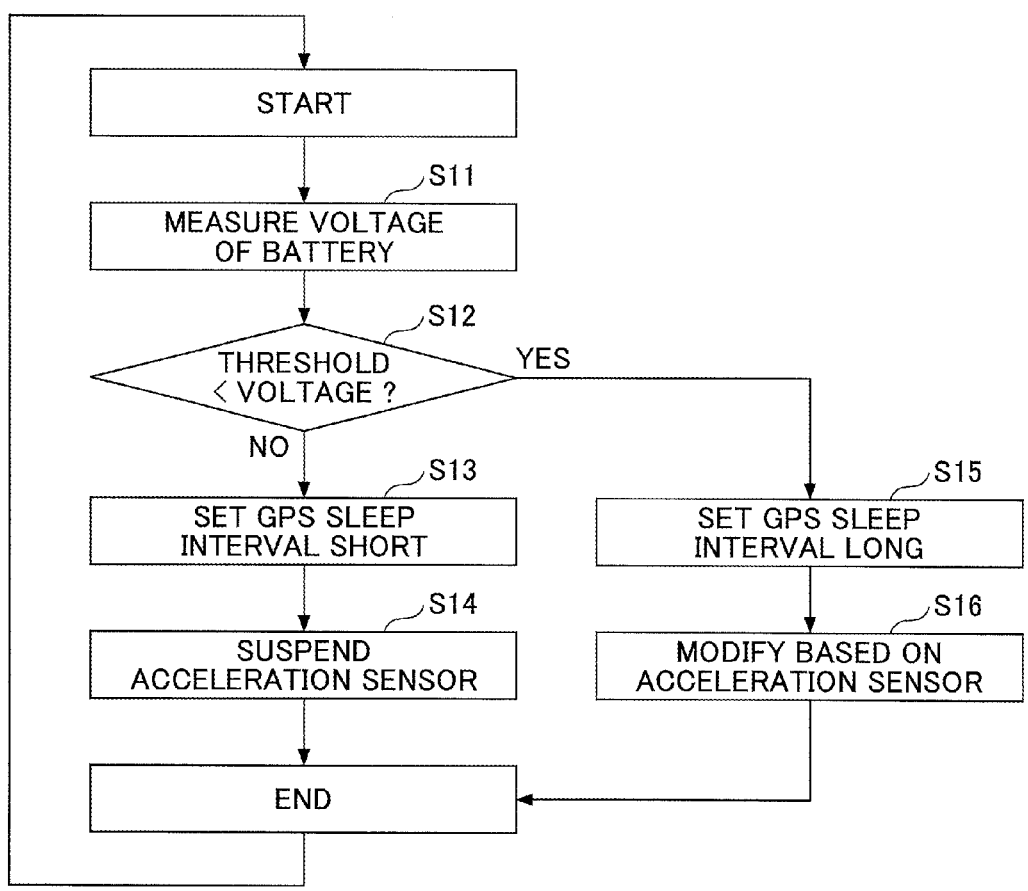
FIG. 10 is a drawing illustrating an example of a control operation performed by an MCU control unit.

FIG. 10 is a drawing illustrating an example of a control operation performed by the MCU control unit 87. In FIG. 10, in step S11, the MCU control unit 87 measures the voltage of the battery 81. In step S12, the MCU control unit 87 checks whether the measured voltage is higher than a predetermined threshold. In the case of the measured voltage being larger than a predetermined threshold, in step S15, the MCU control unit 87 controls GPS 84 such that the sleep period of the GPS 84 (i.e., the period between consecutive location measuring processes) is set to a predetermined relatively long period, and, then, the location measuring process by the GPS 84 is performed. In step S16, after the location measuring process by the GPS 84, the acceleration measuring process by the acceleration sensor 86 and the location modifying process by the DSP computation unit 85 are performed under the control of the MCU control unit 87.

In the case of the measured voltage being not larger than a predetermined threshold according to the check in step S12, in step S13, the MCU control unit 87 controls GPS 84 such that the sleep period of the GPS 84 (i.e., the period between consecutive location measuring processes) is set to a predetermined relatively short period, and, then, the location measuring process by the GPS 84 is performed. In step S14, the DSP computation unit 85 is caused to perform a minimum operation under the control of the MCU control unit 87. At this time, the acceleration sensor 86 is placed in the suspended state.

Figure 11:
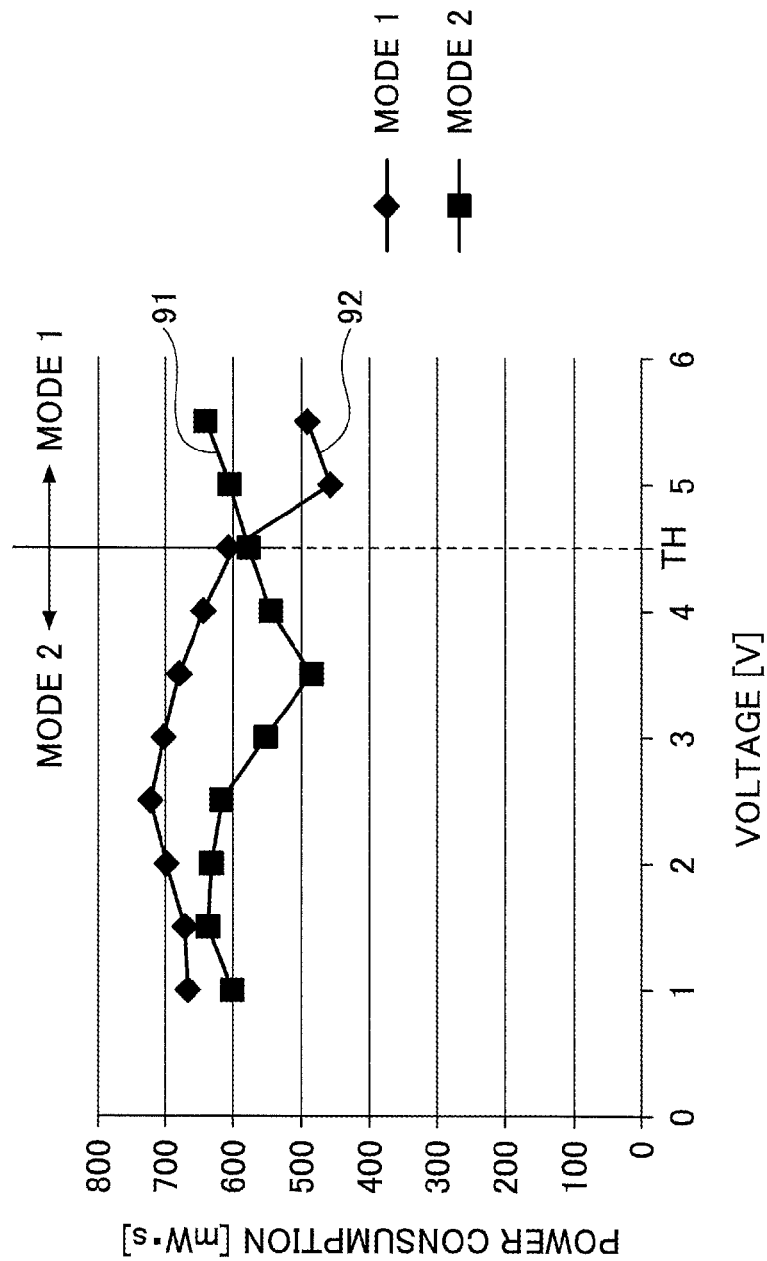
FIG. 11 is a drawing illustrating the effect of switching of operation modes in response to an input direct-current voltage.

FIG. 11 is a drawing illustrating the effect of switching of operation modes in response to the input direct-current voltage. It is assumed that the DC-DC converters 82 and 83 have the efficiency curve illustrated in FIG. 1, and that T2:T1 in FIG. 9A is 1:11, with T3:T4 in FIG. 9B being 1:200. Further, the amount of current consumption by the GPS during operation is 70 mA, and the amount of current consumption by the acceleration sensor 86 during operation is 0.5 mA. The amount of current consumption by the DSP computation unit 85 is 10 mA at the time of correction computation (i.e., during T4), and is 1 mA at the time of other processes (i.e., during T1 and T3).

In FIG. 11, the horizontal axis represents input direct-current voltage (i.e., the voltage of the battery 81), and the vertical axis represents the total amount of power consumption (i.e., the total area size illustrated in FIG. 9A or the total area size illustrated in FIG. 9B). In FIG. 11, a curve 92 represents the total amount of power consumption with respect to each input direct-current voltage in the first operation mode, and a curve 91 represents the total amount of power consumption with respect to each input direct-current voltage in the second operation mode. In the case of the input direct-current voltage being relatively high, the total amount of power consumption is smaller in the first operation mode. In the case of the input direct-current voltage being relatively low, the total amount of power consumption is smaller in the second operation mode. In this example, a threshold voltage TH is about 4.5 V. Which one of the curve 91 and the curve 92 is higher than the other differs between the left-hand side and the right-hand side of the threshold voltage TH. Namely, it is preferable for the purpose of reducing power consumption to use the first operation mode when the input direct-current voltage is higher than the threshold voltage TH and to use the second operation mode when the input direct-current voltage is lower than the threshold voltage TH.

Further, the present invention is not limited to these embodiments, but various variations and modifications may be made without departing from the scope of the present invention.

The above-described embodiments use the first circuit for performing the first process and the second circuit for performing the second process whose load can be reduced by the first process. This is not a limiting example, and the number of processes and the number of circuits are not limited to two. For example, three circuits may be provided that operate with three different direct-current power supply voltages. The ratio of the volumes of processing performed by these three circuits may be changed in response to the input direct-current voltage supplied to the DC-DC converters.

In the above-described embodiments, the first circuit for performing the first process operates with the first direct-current power supply voltage, and the second circuits for performing the second process whose load can be reduced by the first process operates with the second direct-current power supply voltage, with the second direct-current power supply voltage being higher than the first direct-current power supply voltage. Nonetheless, the relationship between the direct-current power supply voltages is not limited to the relationship used in these embodiments. For example, the first direct-current power supply voltage may be set higher than the second direct-current power supply voltage.

According to at least one embodiment, an electronic apparatus is provided that can reduce power loss in the DC-DC converters.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An electronic apparatus, comprising:
   a first DC-DC converter configured to generate a first direct-current power supply voltage based on an input direct-current voltage;

a second DC-DC converter configured to generate a second direct-current power supply voltage based on the input direct-current voltage;

a first circuit configured to operate with the first direct-current power supply voltage to perform a first process;

a second circuit configured to operate with the second direct-current power supply voltage to perform a second process whose load is able to be reduced by the first process; and a control circuit configured to change, in response to the input direct-current voltage, a ratio between a volume of processing of the first process and a volume of processing of the second process.

2. The electronic apparatus as claimed in claim 1, wherein the control circuit decreases the volume of processing of the second process when increasing the volume of processing of the first process in response to the input direct-current voltage.

3. The electronic apparatus as claimed in claim 2, wherein the control circuit decreases the volume of processing of the second process by shortening a time length for which the second process is performed.

4. The electronic apparatus as claimed in claim 3, wherein the control circuit decreases the volume of processing of the second process by shortening a total time length equal to a sum of time lengths for which the second process is performed during a predetermined period.

5. The electronic apparatus as claimed in claim 3, wherein the first process is a computation process that compresses data, and the second process is a transmission process that transmits either the data without compression or the compressed data.

6. The electronic apparatus as claimed in claim 4, wherein the second process is a process that measures a location of the electronic apparatus, and the first process is a computation process that modifies the measured location in response to acceleration of the electronic apparatus.

7. An electronic apparatus, comprising:
a first DC-DC converter configured to generate a first direct-current power supply voltage based on an input direct-current voltage;
a second DC-DC converter configured to generate a second direct-current power supply voltage based on the input direct-current voltage;
a sensor;
a processing circuit configured to operate with the first direct-current power supply voltage to perform a computation process on data collected by the sensor;
a transmission unit configured to operate with the second direct-current power supply voltage to transmit either the data collected by the sensor or the data that has gone through the computation process; and
a control circuit configured to select a first operation mode or a second operation mode in response to the input direct-current voltage, wherein in the first operation mode the data collected by the sensor is transmitted from the transmission unit, and in the second operation mode the data collected by the sensor is subjected to the computation process by the processing circuit, and the data having gone through the computation process is transmitted from the transmission unit.

8. An electronic apparatus, comprising:
a first DC-DC converter configured to generate a first direct-current power supply voltage based on an input direct-current voltage;
a second DC-DC converter configured to generate a second direct-current power supply voltage based on the input direct-current voltage;
an acceleration sensor configured to measure acceleration;
a location measuring circuit configured to operate with the first direct-current power supply voltage to perform a location measuring process that measures a location;
a processing circuit configured to operate with the second direct-current power supply voltage to perform a computation process that modifies the measured location in response to the measured acceleration; and
a control circuit configured to select a first operation mode or a second operation mode in response to the input direct-current voltage, wherein in the first operation mode the location measuring process is performed at first frequency, and in the second operation mode the location measuring process is performed at second frequency lower than the first frequency, and the acceleration sensor measures acceleration, with the measured location being modified based on the measured acceleration.

* * * * *